United States Patent
Zeiynali Farid et al.

(10) Patent No.: US 12,179,763 B2
(45) Date of Patent: Dec. 31, 2024

(54) DETERMINING A LANE CHANGE DECISION BASED ON A DOWNSTREAM TRAFFIC STATE

(71) Applicant: Toyota Motor Engineering & Manufacturing North America, Inc., Plano, TX (US)

(72) Inventors: Yashar Zeiynali Farid, Berkeley, CA (US); Kentaro Oguchi, Mountain View, CA (US); Abdul Rahman Kreidieh, Oakland, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 528 days.

(21) Appl. No.: 17/474,613

(22) Filed: Sep. 14, 2021

(65) Prior Publication Data
US 2023/0083645 A1 Mar. 16, 2023

(51) Int. Cl.
*B60W 30/18* (2012.01)
*B60W 40/04* (2006.01)

(52) U.S. Cl.
CPC .......... *B60W 30/18163* (2013.01); *B60W 2554/4042* (2020.02); *B60W 2720/106* (2013.01)

(58) Field of Classification Search
CPC .......... B60W 30/18163; B60W 2554/4042; B60W 2720/106; B60W 2556/50; B60W 40/04

(Continued)

(56) References Cited

U.S. PATENT DOCUMENTS 6,411,328 B1 6/2002 Franke et al.
8,260,498 B2 9/2012 Deng
(Continued)

FOREIGN PATENT DOCUMENTS

DE 102011083677 A1 4/2013
WO 2018132378 A2 7/2018

OTHER PUBLICATIONS

Seo et al., "Traffic State Estimation on Highway: A Comprehensive Survey," Journal of Annual Reviews in Control, vol. 43, 2017, pp. 128-151.
Unknown, "Land guidance wrong," Aug. 24, 2019, 8 pages, found at https://support.google.com/maps/thread/12716772/landguidancewrong?hl=en.
(Continued)

*Primary Examiner* — Ian Jen
*Assistant Examiner* — Hossam M Abd El Latif
(74) *Attorney, Agent, or Firm* — Christopher G. Darrow; DARROW MUSTAFA PC

(57) ABSTRACT

A system for determining a lane change decision based on a downstream traffic state can include a processor, a communications device, and a memory. The processor can be disposed on an ego vehicle. The memory can store an acceleration gain module and a communications module. The acceleration gain module can include instructions that cause the processor to: (1) obtain, via the communications device and from a monitoring system, information about an end of stopped or slow moving downstream traffic in a lane and (2) calculate a result of an equation for the lane change decision. The equation can include information about virtual vehicles positioned near the end or a geographical location. The communications module can include instructions that cause the processor to cause a signal, with information based on the result, to be sent to a component of the ego vehicle for an action to be performed by the component.

20 Claims, 6 Drawing Sheets

(58) Field of Classification Search
USPC .......................................................... 701/25
See application file for complete search history.

(56) References Cited

U.S. PATENT DOCUMENTS

| | | | |
|---|---|---|---|
| 9,240,123 | B2 | 1/2016 | Stenneth |
| 9,672,734 | B1 | 6/2017 | Ratnasingam |
| 9,964,414 | B2 | 5/2018 | Slavin et al. |
| 10,324,469 | B2 | 6/2019 | Berntorp et al. |
| 10,692,365 | B2 | 6/2020 | Ran et al. |
| 10,697,790 | B2 | 6/2020 | Sumizawa |
| 10,807,599 | B2 | 10/2020 | Zhu et al. |
| 2007/0005231 | A1 | 1/2007 | Seguchi |
| 2014/0278052 | A1 | 9/2014 | Slavin et al. |
| 2014/0358414 | A1* | 12/2014 | Ibrahim ................. G01C 21/10 701/119 |
| 2017/0322046 | A1 | 11/2017 | Gordon |
| 2017/0370745 | A1 | 12/2017 | Woolley |
| 2018/0170388 | A1* | 6/2018 | Shin ................ B60W 30/18163 |
| 2018/0267537 | A1* | 9/2018 | Kroop .................. G05D 1/0027 |
| 2018/0299290 | A1 | 10/2018 | Slavin et al. |
| 2019/0009784 | A1* | 1/2019 | Takeda ............ B60W 30/18154 |
| 2019/0176823 | A1* | 6/2019 | Avedisov ............... G08G 1/166 |
| 2019/0392712 | A1 | 12/2019 | Ran et al. |
| 2020/0005633 | A1 | 1/2020 | Jin et al. |
| 2021/0065547 | A1 | 3/2021 | Ran et al. |
| 2022/0114885 | A1* | 4/2022 | Ran ....................... B60W 40/04 |
| 2022/0371612 | A1* | 11/2022 | Wray ............... G08G 1/096725 |

OTHER PUBLICATIONS

Unknown, "Here Lanes," 9 pages, last accessed Aug. 31, 2021, found at https://www.here.com/platform/mapping/lanes.

Dubbelman et al., "Low Cost GNSS and Computer Vision Fusion for Accurate Lane Level Navigation and Enhanced Automatic Map Generation," 2016, 20 pages.

Unknown, "Lane-level accuracy via fusion and hybridization algorithms for GNSS, IMU, Map and Computer Vision signal," Horizon 2020, 4 pages, found at https://inlane.eu/inlane-solution/architecture/.

Phate Zhang, "Gaode Map launches lane level navigation, Huawei phones first to be supported," Oct. 31, 2020, 3 pages, found at https://cntechpost.com/2020/10/31/gaode-map-launches-lane-level-navigation-huawei-phones-first-to-be-supported/.

Unknown, "Lanes," 13 pages, last accessed on Aug. 31, 2021, found at https://wazeopedia.waze.com/wiki/USA/Lanes.

Brandon Russell, "Waze is getting lane guidance, trip suggestions, and traffic notifications," Sep. 15, 2020, 9 pages, found at https://www.xda-developers.com/waze-adds-lane-guidance-trip-suggestions-traffic-notifications/.

Unknown, "Innovative End-of-Queue Warning System Reduces Crashes Up to 45%," Sep. 2015, 2 pages.

Molzahn et al., "Jam Tail Warnings Based on Vehicle Probe Data," Transportation Research Procedia, vol. 27, 2017, pp. 808-815.

Clements et al., "Real-time Safety Alerts for Severe Weather and Jam Tails," Les Rencontres de la Mobilité Intelligente, 2016, pp. 1-8.

Di et al., "A Survey on Autonomous Vehicle Control in the Era of Mixed-Autonomy: From Physics-Based to AI-Guided Driving Policy Learning," Transportation Research Part C, 2021, vol. 125, Apr. 2021, pp. 1-50.

Unknown, "Swift Navigation Demonstrates First-Ever Nationwide Lane-Level Precise Positioning With Ambitious Continental U.S. Drive Test," Swift Navigation, Jun. 9, 2020, 2 pages.

Amir Baruch, "Dynamic Lane Level Guidance—What It Is and Why You Should Care," Telenav, Mar. 19, 2019, 4 pages.

Willem Strijbosch, "TomTom and inLane: Building Lane-Level Technology for Autonomous Driving," Jul. 19, 2018, 5 pages, found at https://www.linkedin.com/pulse/tomtom-inlane-building-lane-level-technology-driving-strijbosch.

Treiber et al., "Modeling lane-changing decisions with MOBIL," Traffic and Granular Flow '07, 2009, Springer, Berlin, Heidelberg, pp. 1-10.

Schakel et al., "Integrated Lane Change Model with Relaxation and Synchronization," Transportation Research Record, vol. 2316, issue 1, 2012, pp. 47-57.

Subraveti et al., "First order multi-lane traffic flow model—an incentive based macroscopic model to represent lane change dynamics," Transportmetrica B: Transport Dynamics, vol. 7, issue 1, Dec. 2019, pp. 1758-1779.

Chacon et al., "The Effect of Augmented Driver Behavior on Freeway Traffic Flow," Presented at the 53rd Transportation Research Forum Annual Conference, Tampa, Florida, Mar. 2012, pp. 1-21.

Toledo et al., "A Lane-changing Model with Explicit Target Lane Choice," Transportation Research Record Journal of the Transportation Research Board, vol. 1934, issue 1, Jan. 2005, pp. 157-165.

Moridpour et al., "Lane changing models: A critical review," Jul. 2010, Transportation Letters The International Journal of Transportation Research, vol. 2, issue 3, Jul. 2010, pp. 157-173.

* cited by examiner

DETERMINING A LANE CHANGE DECISION BASED ON A DOWNSTREAM TRAFFIC STATE

TECHNICAL FIELD

The disclosed technologies are directed to determining a lane change decision based on a downstream traffic state.

BACKGROUND

A speed of a first vehicle, moving in a direction in a first lane of a first road, can be reduced in order to change, at an intersection, from moving on the first road to moving on a second road. For example, the second road can be a ramp of an interchange. Because of this reduction in speed of the first vehicle, a speed of a second vehicle, which is following the first vehicle in the first lane, can also be reduced. In order to optimize a flow of traffic, many roads can include more than one lane for a direction of traffic. With more than one lane for a direction of traffic, the second vehicle can select to remain moving in the first lane or to change from moving within the first lane to moving within one of one or more other lanes. (Conventionally, for a road with more than one lane for a direction of traffic, slower traffic moves in the right lane while faster traffic moves in the one or more other lanes.) Thus, having more than one lane for a direction of traffic can also allow a vehicle to select to change from moving within the first lane to moving within one of one or more other lanes in response to other stopped or slow moving traffic downstream in the first lane. However, in determining a selection between moving within the first lane and moving within one of one or more other lanes, a vehicle or an operator of the vehicle may also need to take into consideration a need for the vehicle to be within the first lane in order to change, in accordance with a determined path of travel for the vehicle, from moving on the first road to moving on the second road.

SUMMARY

In an embodiment, a system for determining a lane change decision based on a downstream traffic state can include a processor, a communications device, and a memory. The processor can be disposed on an ego vehicle. The memory can store an acceleration gain module and a communications module. The acceleration gain module can include instructions that when executed by the processor cause the processor to: (1) obtain, via the communications device and from a monitoring system, information about an end of stopped or slow moving downstream traffic in a lane and (2) calculate a result of an equation for the lane change decision. The equation can include information about virtual vehicles positioned near the end or at a geographical location. The communications module can include instructions that when executed by the processor cause the processor to cause a signal, with information based on the result, to be sent to a component of the ego vehicle for an action to be performed by the component.

In another embodiment, a method for determining a lane change decision based on a downstream traffic state can include obtaining, by a processor of an ego vehicle, via a communications device, and from a monitoring system, information about an end of stopped or slow moving downstream traffic in a lane. The method can also include calculating, by the processor, a result of an equation for the lane change decision. The equation can include information about virtual vehicles positioned near the end or at a geographical location. The method can also include causing, by the processor, a signal, with information based on the result, to be sent to a component of the ego vehicle for an action to be performed by the component.

In another embodiment, a non-transitory computer-readable medium for determining a lane change decision based on a downstream traffic state can include instructions that when executed by one or more processors cause the one or more processors to obtain, via a communications device and from a monitoring system, information about an end of stopped or slow moving downstream traffic in a lane. The non-transitory computer-readable medium can also include instructions that when executed by the one or more processors cause the one or more processors to calculate a result of an equation for the lane change decision. The equation can include information about virtual vehicles positioned near the end or at a geographical location. The non-transitory computer-readable medium can also include instructions that when executed by the one or more processors cause the one or more processors to cause a signal, with information based on the result, to be sent to a component of an ego vehicle for an action to be performed by the component.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
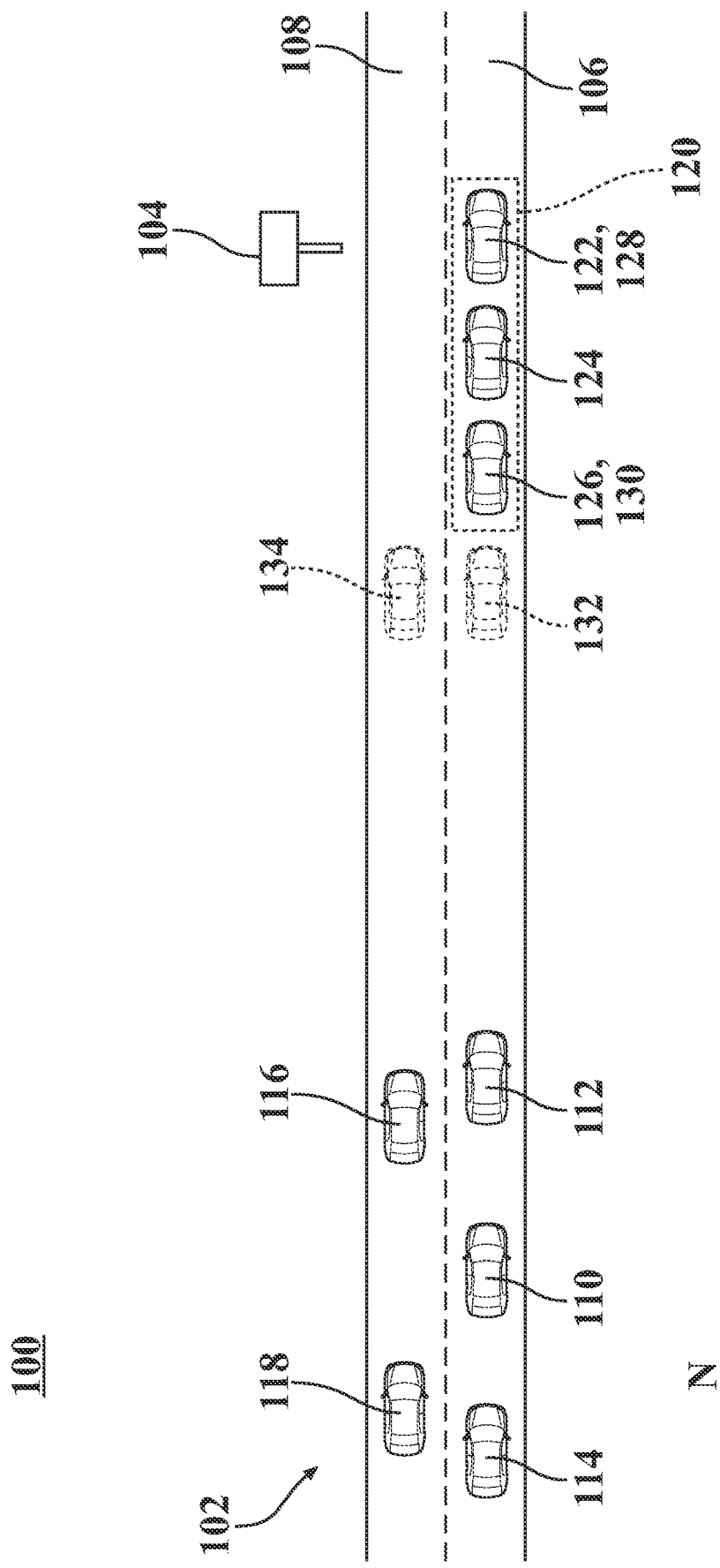
FIG. 1 includes a diagram that illustrates a first example of an environment for determining a lane change decision based on a downstream traffic state, according to the disclosed technologies.

"Connected car" technologies can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

A micro cloud can be characterized by a distribution, among members of the micro cloud, of one or more of one or more computing resources or one or more data storage resources in order to collaborate on executing operations. The members can include at least connected cars.

The disclosed technologies are directed to determining a lane change decision based on a downstream traffic state. Information about an end of stopped or slow moving downstream traffic in a first lane can be obtained, via a communications device and from a monitoring system, by an ego vehicle. For example, the monitoring system can include one or more of a roadside unit, an edge server, a micro cloud having the ego vehicle as a member, a communication via "Vehicle to Vehicle" (V2V) technology, or the like. A result of an equation for the lane change decision can be calculated. The equation can include information about virtual vehicles positioned near the end of the stopped or slow moving downstream traffic or at a geographical location. For example, the lane change decision can be with respect to having the ego vehicle change from moving within the first lane to moving within a second lane. For example, the equation can be for a measure of a total acceleration gain, for one or more of the ego vehicle or one or more vehicles in a vicinity of the ego vehicle, associated with the lane change decision. A signal, with information based on the result of the equation, can be caused to be sent to a component of the ego vehicle for an action to be performed by the component.

For example, the equation can include a first term for a portion of an acceleration gain of the ego vehicle due to an effect of an action performed by the ego vehicle. For example, the first term can account for a "selfishness" contribution (e.g., an advantage for the ego vehicle itself) to the total acceleration gain.

Additionally, for example, the equation can include a second term for a portion of the total acceleration gain due to an effect of one or more actions performed by the one or more vehicles in the vicinity of the ego vehicle. For example, the second term can account for a "politeness" contribution (e.g., an advantage for the one or more vehicles in the vicinity of the ego vehicle) to the total acceleration gain. That is, inclusion of the second term in the equation can ensure that the equation is not limited to taking into consideration only an effect on the ego vehicle.

Additionally, for example, the equation can include a third term for a portion of the acceleration gain of the ego vehicle due to an effect of the stopped or slow moving downstream traffic. For example, the portion of the acceleration gain of the ego vehicle due to the effect of the stopped or slow moving downstream traffic can be determined from the information about the virtual vehicles. For example, the third term can account for a "downstream effect" contribution to the total acceleration gain. That is, inclusion of the third term in the equation can ensure that the equation is not limited to taking into consideration only effects in the vicinity of the ego vehicle.

FIG. 1 includes a diagram that illustrates a first example of an environment 100 for determining a lane change decision based on a downstream traffic state, according to the disclosed technologies. For example, the environment 100 can include a road 102 (disposed along a line of latitude) and a roadside unit 104. For example, the road 102 can include, for traffic moving in an easterly direction, a first lane 106 and a second lane 108. For example, the environment 100 can include an ego vehicle 110, a first vehicle 112, a second vehicle 114, a third vehicle 116, a fourth vehicle 118, and stopped or slow moving downstream traffic 120. The ego vehicle 110 can be a connected car. The first vehicle 112, the second vehicle 114, the third vehicle 116, and the fourth vehicle 118 can be in a vicinity of the ego vehicle 110. The ego vehicle 110 can be moving within the first lane 106. The first vehicle 112 can lead the ego vehicle 110 in the first lane 106. The second vehicle 114 can follow the ego vehicle 110 in the first lane 106. The third vehicle 116 and the fourth vehicle 118 can be moving within the second lane 108. The third vehicle 116 can be near to the first vehicle 112. The fourth vehicle 118 can be near to the second vehicle 114. The stopped or slow moving downstream traffic 120 can be in the first lane 106 downstream of the ego vehicle 110. For example, the stopped or slow moving downstream traffic 120 can include a fifth vehicle 122, a sixth vehicle 124, and a seventh vehicle 126. The fifth vehicle 122 can be at a front end 128 of the stopped or slow moving downstream traffic 120. The seventh vehicle 126 can be at a back end 130 the stopped or slow moving downstream traffic 120. The sixth vehicle 124 can be between the fifth vehicle 122 and the seventh vehicle 126.

Figure 2:
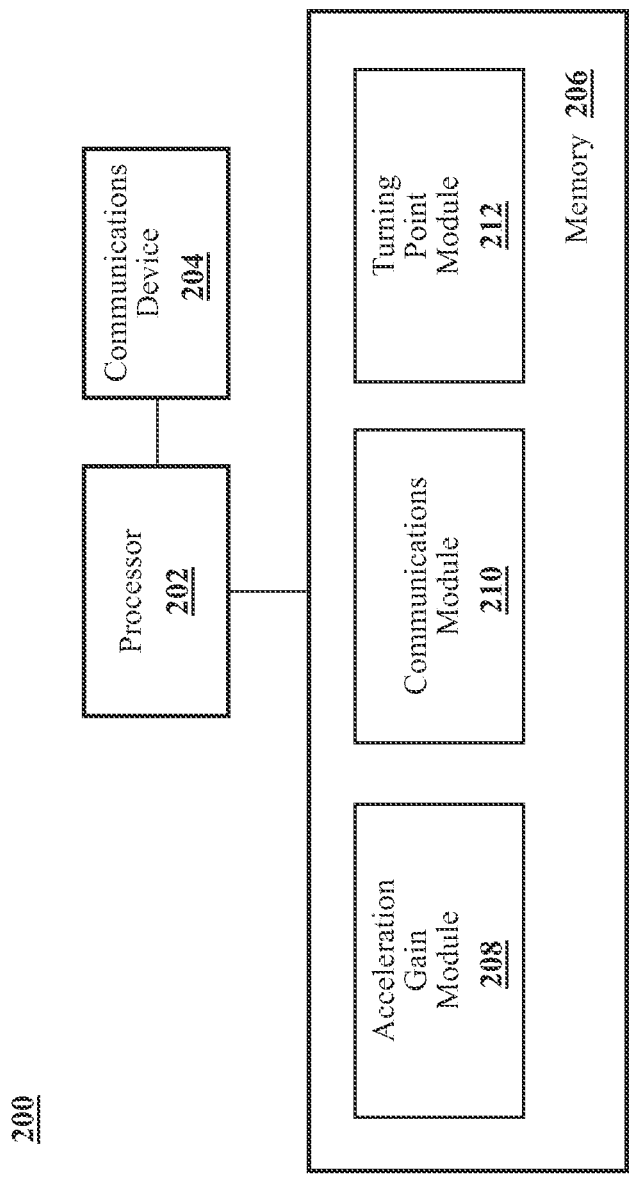
FIG. 2 includes a block diagram that illustrates an example of a system for determining a lane change decision based on a downstream traffic state, according to the disclosed technologies.

FIG. 2 includes a block diagram that illustrates an example of a system 200 for determining a lane change decision based on a downstream traffic state, according to the disclosed technologies. The system 200 can include, for example, a processor 202, a communications device 204, and a memory 206. The processor 202 can be disposed on an ego vehicle. For example, the ego vehicle can be the ego vehicle 110 illustrated in FIG. 1. The communications device 204 can be communicably coupled to the processor 202. The memory 206 can be communicably coupled to the processor 202. The memory 206 can store, for example, an acceleration gain module 208 and a communications module 210.

For example, the acceleration gain module 208 can include instructions that function to control the processor 202 to obtain, via the communications device 204 and from a monitoring system, information about an end of stopped or slow moving downstream traffic in a first lane. For example, the monitoring system can include one or more of a roadside unit, an edge server, a micro cloud having the ego vehicle as a member, a communication via "Vehicle to Vehicle" (V2V) technology, or the like.

With reference to FIG. 1, for example, the roadside unit 104 can be included in a monitoring system. For example, the ego vehicle 110 can obtain, from the roadside unit 104, the information about the end of the stopped or slow moving downstream traffic 120 in the first lane 106.

Returning to FIG. 2, for example, the acceleration gain module 208 can include instructions that function to control the processor 202 to calculate a result of an equation for the lane change decision. The equation can include information about virtual vehicles positioned near the end of the stopped or slow moving downstream traffic or at a geographical location. For example, the lane change decision can be with respect to having the ego vehicle change from moving within the first lane to moving within a second lane. For example, the equation can be for a measure of a total acceleration gain, for one or more of the ego vehicle or one or more vehicles in a vicinity of the ego vehicle, associated with the lane change decision. For example, the equation can be:

total acceleration gain=first term+second term+third term

In a first configuration, the equation can include the third term for a portion of an acceleration gain of the ego vehicle, in the situation in which the ego vehicle changes from moving within the current lane to moving within the different lane, due to an effect of the stopped or slow moving traffic. For example, the third term can account for a "downstream effect" contribution to the total acceleration gain.

For example, the information about the end of the stopped or slow moving downstream traffic can be information about a back end of the stopped or slow moving downstream traffic. The information about the virtual vehicles can include a speed of a first virtual vehicle and a speed of a second virtual vehicle. The first virtual vehicle can be positioned in the first lane behind the back end of the stopped or slow moving downstream traffic. The speed of the first virtual vehicle can represent an average speed of traffic in the first lane in a vicinity of the first virtual vehicle. The second virtual vehicle can be positioned in the different lane adjacent to the first virtual vehicle. The speed of the second virtual vehicle can represent an average speed of traffic in the second lane in a vicinity of the second virtual vehicle. For example, the portion of the acceleration gain of the ego vehicle due to the effect of the stopped or slow moving downstream traffic can be determined from the information about the virtual vehicles.

For example, the information about the back end of the stopped or slow moving downstream traffic can include a position of a vehicle at the back end and a velocity of the vehicle at the back end.

In a variation, for example, the acceleration gain module 208 can further include instructions that function to control the processor 202 to obtain, via the communications device 204 and from the monitoring system, other information about the stopped or slow moving downstream traffic. The other information can include one or more of a position of a vehicle at a front end of the stopped or slow moving downstream traffic, a velocity of the vehicle at the front end, or an average velocity of the stopped or slow moving downstream traffic.

With reference to FIG. 1, for purposes of the equation, for example: (1) a first virtual vehicle 132 can be considered to be positioned in the first lane 106 behind the back end 130 of the stopped or slow moving downstream traffic 120 and (2) a second virtual vehicle 134 can be considered to be positioned in the second lane 108 adjacent to the first virtual vehicle 132.

Returning to FIG. 2, for example, the third term can include a first difference. The first difference can be of: (1) a portion of a current acceleration of the ego vehicle in the first lane due to the effect of the stopped or slow moving downstream traffic subtracted from (2) a portion of an expected acceleration of the ego vehicle in the second lane due to the effect of the stopped or slow moving downstream traffic.

With reference to FIG. 1, for purposes of the equation, for example, the third term can include the first difference. The first difference can be of: (1) the portion of the current acceleration of the ego vehicle 110 in the first lane 106 due to the effect of the stopped or slow moving downstream traffic 120 subtracted from (2) the portion of the expected acceleration of the ego vehicle 110 in the second lane 108 due to the effect of the stopped or slow moving downstream traffic 120.

Returning to FIG. 2, for example, the third term can further include a first weight. The third term can be equal to a product of the first weight multiplied by the first difference. For example, the first weight can be referred to as the "downstream effect" factor. For example, a typical value for the first weight can be about one hundred.

Additionally, for example, the equation can include the first term for a portion of the acceleration gain of the ego vehicle due to an effect of an action performed by the ego vehicle. For example, the first term can account for a "selfishness" contribution to the total acceleration gain.

For example, the first term can include a second difference. The second difference can be of: (1) a portion of the current acceleration of the ego vehicle in the first lane due to the effect of the action performed by the ego vehicle subtracted from (2) a portion of the expected acceleration of the ego vehicle in the second lane due to the effect of the action performed by the ego vehicle.

With reference to FIG. 1, for purposes of the equation, for example, the first term can include the second difference. The second difference can be of: (1) the portion of the current acceleration of the ego vehicle 110 in the first lane 106 due to the effect of the action performed by the ego vehicle 110 subtracted from (2) the portion of the expected acceleration of the ego vehicle 110 in the second lane 108 due to the effect of the action performed by the ego vehicle 110.

Returning to FIG. 2, for example, the first term can further include a second weight. The first term can be equal to a product of the second weight multiplied by the second difference. For example, the second weight can be referred to as the "selfishness" factor. For example, a typical value for the second weight can be about one.

Additionally, for example, the equation can include the second term for a portion of the total acceleration gain due to an effect of one or more actions performed by the one or more vehicles in the vicinity of the ego vehicle. For example, the second term can account for a "politeness" contribution to the total acceleration gain.

For example, the second term can include a sum. The sum can be of a third difference added to a fourth difference. The third difference can be of: (1) a current acceleration of a vehicle in the second lane subtracted from (2) an expected acceleration of the vehicle in the second lane that, in response to the change by the ego vehicle from moving within the first lane to moving within the second lane, follows the ego vehicle in the second lane. The fourth difference can be of: (1) a current acceleration of a vehicle in the first lane that follows the ego vehicle in the first lane subtracted from (2) an expected acceleration of the vehicle in the first lane that, in response to the change by the ego vehicle from moving within the first lane to moving within the second lane, ceases to follow the ego vehicle.

With reference to FIG. 1, for purposes of the equation, for example, the second term can include the sum. The sum can be of the third difference added to the fourth difference. The third difference can be of: (1) the current acceleration of the fourth vehicle 118 in the second lane 108 subtracted from (2) the expected acceleration of the fourth vehicle 118 in the second lane 108 that, in response to the change by the ego vehicle 110 from moving within the first lane 106 to moving within the second lane 108, follows the ego vehicle 110 in the second lane 108. The fourth difference can be of: (1) the current acceleration of the second vehicle 114 in the first lane 106 that follows the ego vehicle 110 in the first lane 106 subtracted from (2) the expected acceleration of the second vehicle 114 in the first lane 106 that, in response to the change by the ego vehicle 110 from moving within the first lane 106 to moving within the second lane 108, ceases to follow the ego vehicle 110.

Returning to FIG. 2, for example, the second term can further include a third weight. The second term can be equal to a product of the third weight multiplied by the sum of the third difference added to the fourth difference. For example, the third weight can be referred to as the "politeness" factor. For example, a typical value for the third weight can be about one.

Although the description of the first configuration is from a perspective of an environment that includes a road that includes, for traffic moving in one direction, two lanes, one of skill in the art understands, in light of the description herein, that the disclosed technologies associated with the first configuration can be used in an environment that includes a road that includes, for traffic moving in one direction, more than two lanes.

Figure 3:
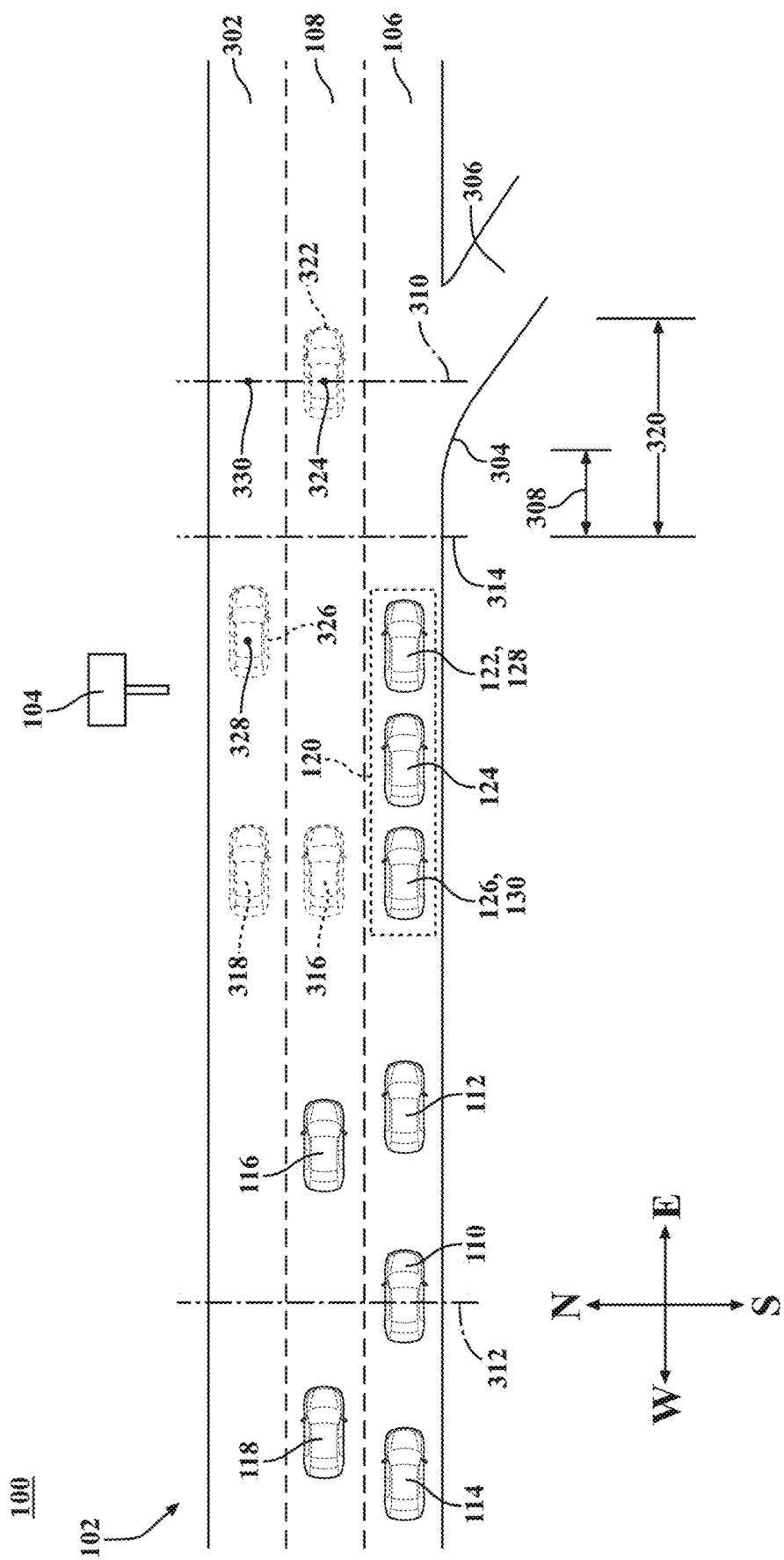
FIG. 3 includes a diagram that illustrates a second example of the environment for determining the lane change decision based on the downstream traffic state, according to the disclosed technologies.

FIG. 3 includes a diagram that illustrates a second example of the environment 100 for determining the lane change decision based on the downstream traffic state, according to the disclosed technologies. For example, the environment 100 can include the road 102 (disposed along the line of latitude) and the roadside unit 104. For example, the road 102 can include, for traffic moving in the easterly direction, the first lane 106, the second lane 108, and a third lane 302. For example, the environment 100 can include the ego vehicle 110, the first vehicle 112, the second vehicle 114, the third vehicle 116, the fourth vehicle 118, and the stopped or slow moving downstream traffic 120. The ego vehicle 110 can be a connected car. The first vehicle 112, the second vehicle 114, the third vehicle 116, and the fourth vehicle 118 can be in the vicinity of the ego vehicle 110. The ego vehicle 110 can be moving within the first lane 106. The first vehicle 112 can lead the ego vehicle 110 in the first lane 106. The second vehicle 114 can follow the ego vehicle 110 in the first lane 106. The third vehicle 116 and the fourth vehicle 118 can be moving within the second lane 108. The third vehicle 116 can be near to the first vehicle 112. The fourth vehicle 118 can be near to the second vehicle 114. The second example of the environment 100 can include an intersection 304 between the road 102 and a different road 306. For example, the different road 306 can be a ramp of an interchange. The stopped or slow moving downstream traffic 120 can be in the first lane 106 downstream of the ego vehicle 110. For example, the stopped or slow moving downstream traffic 120 can include the fifth vehicle 122, the sixth vehicle 124, and the seventh vehicle 126. The fifth vehicle 122 can be at the front end 128 of the stopped or slow moving downstream traffic 120. The seventh vehicle 126 can be at the back end 130 the stopped or slow moving downstream traffic 120. The sixth vehicle 124 can be between the fifth vehicle 122 and the seventh vehicle 126. The intersection 304 can be downstream of the stopped or slow moving downstream traffic 120.

Figure 4:
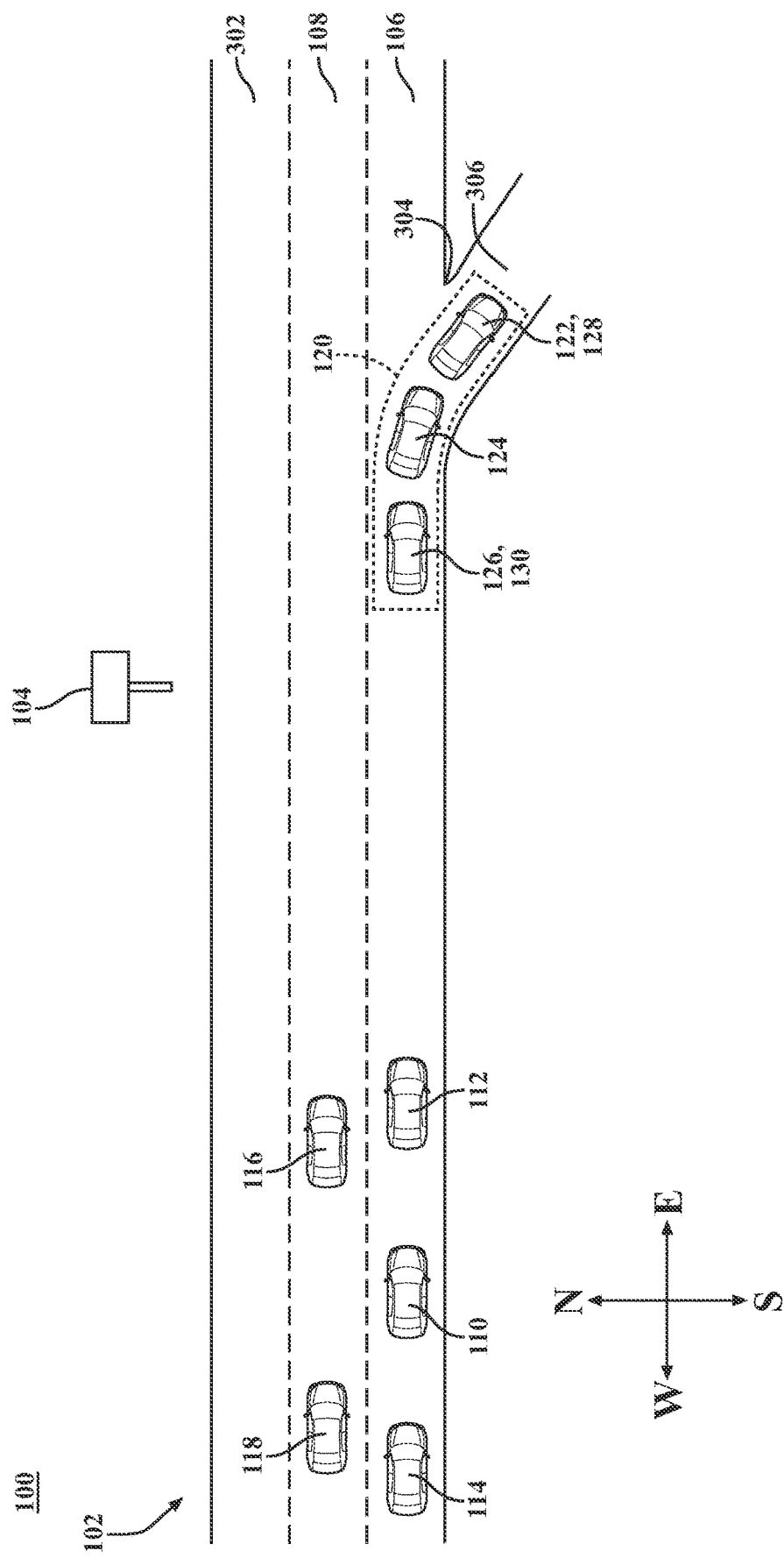
FIG. 4 includes a diagram that illustrates a third example of the environment for determining the lane change decision based on the downstream traffic state, according to the disclosed technologies.

FIG. 4 includes a diagram that illustrates a third example of the environment 100 for determining the lane change decision based on the downstream traffic state, according to the disclosed technologies. For example, the environment 100 can include the road 102 (disposed along the line of latitude) and the roadside unit 104. For example, the road 102 can include, for traffic moving in the easterly direction, the first lane 106, the second lane 108, and the third lane 302. For example, the environment 100 can include the ego vehicle 110, the first vehicle 112, the second vehicle 114, the third vehicle 116, the fourth vehicle 118, and the stopped or slow moving downstream traffic 120. The ego vehicle 110 can be a connected car. The first vehicle 112, the second vehicle 114, the third vehicle 116, and the fourth vehicle 118 can be in the vicinity of the ego vehicle 110. The ego vehicle 110 can be moving within the first lane 106. The first vehicle 112 can lead the ego vehicle 110 in the first lane 106. The second vehicle 114 can follow the ego vehicle 110 in the first lane 106. The third vehicle 116 and the fourth vehicle 118 can be moving within the second lane 108. The third vehicle 116 can be near to the first vehicle 112. The fourth vehicle 118 can be near to the second vehicle 114. The third example of the environment 100 can include the intersection 304 between the road 102 and the different road 306. For example, the different road 304 can be a ramp of an interchange. The stopped or slow moving downstream traffic 120 can be one or more of in the first lane 106 downstream of the ego vehicle 110 or on the different road 306. For example, the stopped or slow moving downstream traffic 120 can include the fifth vehicle 122, the sixth vehicle 124, and the seventh vehicle 126. The fifth vehicle 122 can be at the front end 128 of the stopped or slow moving downstream traffic 120. The seventh vehicle 126 can be at the back end 130 the stopped or slow moving downstream traffic 120. The sixth vehicle 124 can be between the fifth vehicle 122 and the seventh vehicle 126.

Returning to FIG. 2, in a second configuration, the stopped or slow moving downstream traffic can be one or more of downstream in the first lane or downstream on a different road within a determined path of travel for the ego vehicle. For example, the different road can be a ramp of an interchange. The information about the end of the stopped or slow moving downstream traffic can include: (1) a position of a vehicle at a front end of the stopped or slow moving downstream traffic and (2) a velocity of the vehicle at the front end. The memory 206 can further store a turning point module 212.

For example, the turning point module 212 can include instructions that function to control the processor 202 to calculate, based on: (1) the position of the vehicle at the front end of the stopped or slow moving downstream traffic, (2) the velocity of the vehicle at the front end, and (3) an expected velocity of the ego vehicle in the second lane, an abreast position. The abreast position can be a position at which the ego vehicle, in the second lane, is adjacent to the vehicle at the front end.

For example, the turning point module 212 can include instructions that function to control the processor 202 to obtain, via the communications device 204 and from a navigation system, an intersection position. The intersection position can be a position of an intersection between a current road, on which the ego vehicle exists, and the different road.

For example, the turning point module 212 can include instructions that function to control the processor 202 to determine a relationship between a first distance and a sum of a second distance added to a third distance. The first distance can be a distance between the intersection position and a current position of the ego vehicle. The second distance can be a distance between the abreast position and the current position of the ego vehicle. The third distance can be a safe distance for the ego vehicle to perform a lane change.

For example, in response to the relationship being that the first distance is less than the sum of the second distance added to the third distance, the information about the virtual vehicles can include a speed of a first virtual vehicle and a speed of a second virtual vehicle. The first virtual vehicle can be positioned in the second lane adjacent to a vehicle at a back end of the stopped or slow moving downstream traffic. The speed of the first virtual vehicle can be set to zero. The second virtual vehicle can be positioned in a third lane adjacent to the first virtual vehicle. The speed of the second virtual vehicle can be set to zero. For example, a portion of the total acceleration gain due to an effect of the stopped or slow moving downstream traffic can be determined from the information about the virtual vehicles.

Alternatively, for example, in response to the relationship being that the first distance is greater than or equal to the sum of the second distance added to the third distance, the information about the virtual vehicles can include a speed of a first virtual vehicle and a speed of a second virtual vehicle. The first virtual vehicle can be positioned in the second lane at a first point. The first point can be adjacent to the geographic location. The geographic location can be the intersection position. The speed of the first virtual vehicle can be set to zero. The second virtual vehicle can be positioned in a third lane at a second point. The second point can be upstream, by the third distance, from a third point. The third point can be adjacent to the first virtual vehicle. The speed of the second virtual vehicle can set to zero. For example, a portion of the total acceleration gain due to an effect of the stopped or slow moving downstream traffic can be determined from the information about the virtual vehicles.

With reference to FIG. 3, for example, if the third distance is a distance 308, then the first distance (i.e., the distance between an intersection position 310 and a current position 312 of the ego vehicle 110) can be greater than the sum of the second distance (i.e., the distance between an abreast position 314 and the current position 312 of the ego vehicle 110) added to the distance 308. For purposes of the equation, for example, a first virtual vehicle 322 can be considered to be positioned in the second lane 108 at a first point 324. The first point 324 can be adjacent to the geographic location. The geographic location can be the intersection position 310. For purposes of the equation, for example, a second virtual vehicle 326 can be considered to be positioned in the third lane 302 at a second point 328. The second point 328 can be upstream, by the distance 320, from a third point 330. The third point 330 can be adjacent to the first virtual vehicle 322.

Alternatively, for example, if the third distance is a distance 320, then the first distance (i.e., the distance between the intersection position 310 and the current position 312 of the ego vehicle 110) can be less than the sum of the second distance (i.e., the distance between the abreast position 314 and the current position 312 of the ego vehicle 110) added to the distance 320. For purposes of the equation, for example: (1) a first virtual vehicle 316 can be considered to be positioned in the second lane 108 adjacent to the seventh vehicle 126 and (2) a second virtual vehicle 318 can be considered to be positioned in the third lane 302 adjacent to the first virtual vehicle 316.

Although the description of the second configuration is from a perspective of an environment that includes a road that includes, for traffic moving in one direction, three lanes, one of skill in the art understands, in light of the description herein, that the disclosed technologies associated with the first configuration can be used in an environment that includes a road that includes, for traffic moving in one direction, more than three lanes.

Returning to FIG. 2, for example, the communications module 210 can include instructions that function to control the processor 202 to cause a signal, with information based on the result of the equation, to be sent to a component of the ego vehicle for an action to be performed by the component.

For example, the instructions to cause the signal to be sent to the component of the ego vehicle for the action to be performed by the component can include instructions to cause, in response to a value of the result of the equation being greater than a first threshold value, the signal to be sent to the component of the ego vehicle for the action to be performed by the component. For example, the first threshold value can be a threshold acceleration gain. For example, a criterion of having the value of the result of the equation being greater than the threshold acceleration gain can be referred to as an incentive criterion.

For example, the instructions to cause, in response to the value of the result of the equation being greater than the first threshold value, the signal to be sent to the component of the ego vehicle for the action to be performed by the component can include instructions to cause, in response to the value of the result of the equation being greater than the first threshold value and another criterion being greater than a second threshold value, the signal to be sent to the component of the ego vehicle for the action to be performed by the component. For example, the other criterion can be an expected acceleration of a vehicle in a second lane that, in response to a change by the ego vehicle from moving within the first lane to moving within the second lane, follows the ego vehicle in the second lane. For example, the second threshold value can be a difference of a safe deceleration limit subtracted from zero. For example, a criterion of having the expected acceleration of the vehicle in the second lane that, in response to the change by the ego vehicle from moving within the first lane to moving within the second lane, follows the ego vehicle in the second lane being greater than the difference of the safe deceleration limit subtracted from zero can be referred to as a safety criterion.

With reference to FIG. 1, for example, the safety criterion can be based on the expected acceleration of the fourth vehicle 118 in the second lane 108 that, in response to the change by the ego vehicle 110 from moving within the first lane 106 to moving within the second lane 108, follows the ego vehicle 110 in the second lane 108.

Returning to FIG. 2, in a third configuration, the ego vehicle can be an automated vehicle. The instructions to cause the signal, with the information based on the result of the equation, to be sent to the component of the ego vehicle for the action to be performed by the component can include instructions to cause the signal, with the information based on the result of the equation being based on the result being that a total acceleration gain associated with the lane change decision is greater than a threshold acceleration gain, to be sent to one or more vehicle systems of the ego vehicle to cause the one or more vehicle systems to cause the ego vehicle to change from moving within the first lane to moving within a second lane.

In a fourth configuration, the instructions to cause the signal, with the information based on the result of the equation, to be sent to the component of the ego vehicle for the action to be performed by the component can include instructions to cause the signal, with the information based on the result of the equation, to be sent to an output system of the ego vehicle to cause the information based on the result of the equation to be presented to an operator of the ego vehicle. For example, the output system can be one or more of a display, a speaker, a haptic device, or the like. For example, the display can be one or more of a console display, a head up display, or the like.

Figure 5:
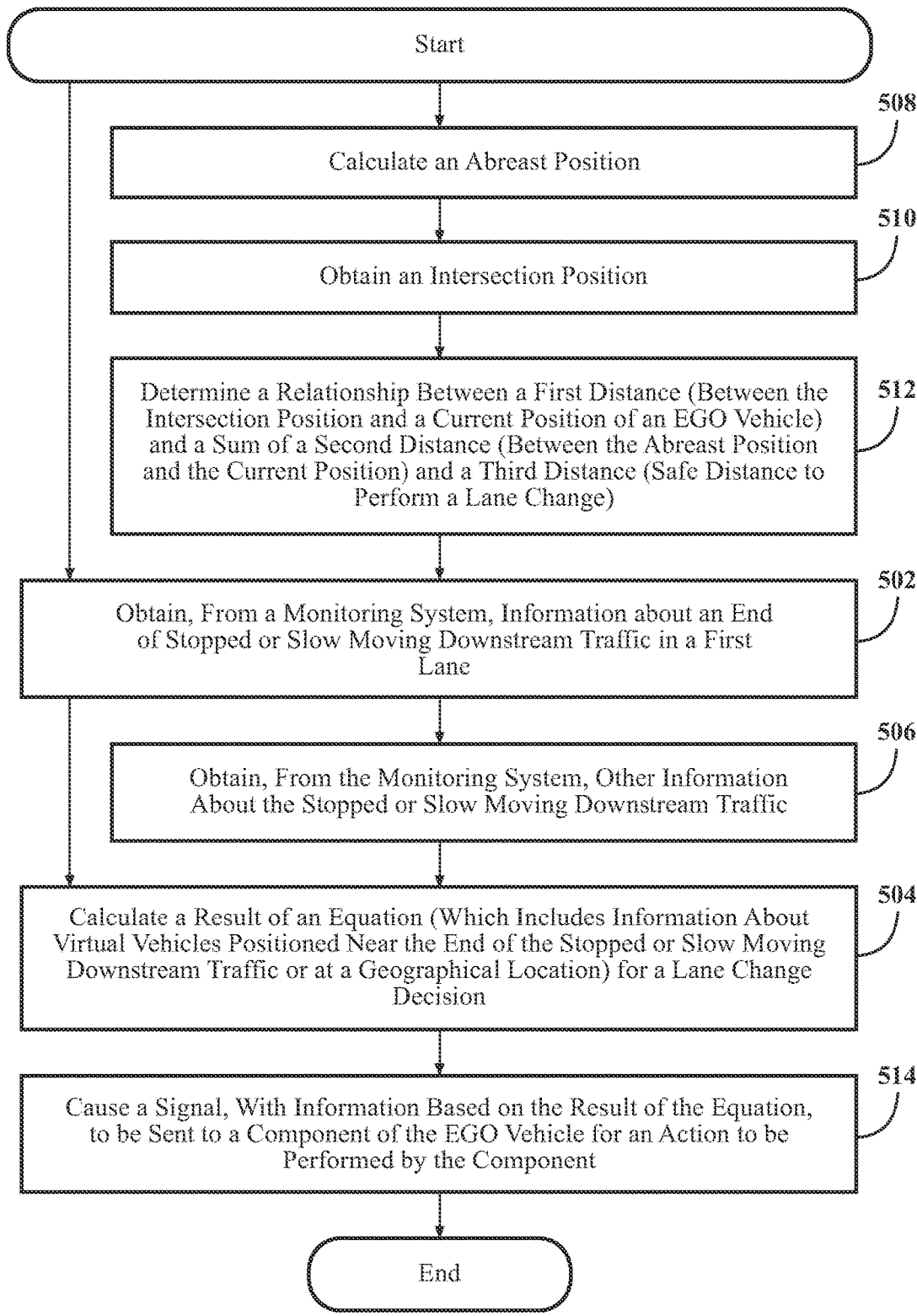
FIG. 5 is a flow diagram that illustrates an example of a method that is associated with determining a lane change decision based on a downstream traffic state, according to the disclosed technologies.

FIG. 5 is a flow diagram that illustrates an example of a method 500 that is associated with determining a lane change decision based on a downstream traffic state, according to the disclosed technologies. Although the method 500 is described in combination with the system 200 illustrated in FIG. 2, one of skill in the art understands, in light of the description herein, that the method 500 is not limited to being implemented by the system 200 illustrated in FIG. 2. Rather, the system 200 illustrated in FIG. 2 is an example of a system that may be used to implement the method 500. Additionally, although the method 500 is illustrated as a generally serial process, various aspects of the method 500 may be able to be executed in parallel.

In FIG. 5, in the method 500, at an operation 502, for example, the acceleration gain module 208 can obtain, via the communications device 204 and from a monitoring system, information about an end of stopped or slow moving downstream traffic in a first lane. For example, the monitoring system can include one or more of a roadside unit, an edge server, a micro cloud having the ego vehicle as a member, a communication via "Vehicle to Vehicle" (V2V) technology, or the like.

At an operation 504, for example, the acceleration gain module 208 can calculate a result of an equation for the lane change decision. The equation can include information about virtual vehicles positioned near the end of the stopped or slow moving downstream traffic or at a geographical location. For example, the lane change decision can be with respect to having the ego vehicle change from moving within the first lane to moving within a second lane. For example, the equation can be for a measure of a total acceleration gain, for one or more of the ego vehicle or one or more vehicles in a vicinity of the ego vehicle, associated with lane change decision. For example, the equation can be:

total acceleration gain=first term+second term+third term

In a first configuration, the equation can include the third term for a portion of an acceleration gain of the ego vehicle, in the situation in which the ego vehicle changes from moving within the current lane to moving within the different lane, due to an effect of the stopped or slow moving traffic. For example, the third term can account for a "downstream effect" contribution to the total acceleration gain.

For example, the information about the end of the stopped or slow moving downstream traffic can be information about a back end of the stopped or slow moving downstream traffic. The information about the virtual vehicles can include a speed of a first virtual vehicle and a speed of a second virtual vehicle. The first virtual vehicle can be positioned in the first lane behind the back end of the stopped or slow moving downstream traffic. The speed of the first virtual vehicle can represent an average speed of traffic in the first lane in a vicinity of the first virtual vehicle. The second virtual vehicle can be positioned in the different lane adjacent to the first virtual vehicle. The speed of the second virtual vehicle can represent an average speed of traffic in the second lane in a vicinity of the second virtual vehicle. For example, the portion of the acceleration gain of the ego vehicle due to the effect of the stopped or slow moving downstream traffic can be determined from the information about the virtual vehicles.

For example, the information about the back end of the stopped or slow moving downstream traffic can include a position of a vehicle at the back end and a velocity of the vehicle at the back end.

In a variation, at an operation 506, for example, the acceleration gain module 208 can obtain, via the communications device 204 and from the monitoring system, other information about the stopped or slow moving downstream traffic. The other information can include one or more of a position of a vehicle at a front end of the stopped or slow moving downstream traffic, a velocity of the vehicle at the front end, or an average velocity of the stopped or slow moving downstream traffic.

For example, the third term can include a first difference. The first difference can be of: (1) a portion of a current acceleration of the ego vehicle in the first lane due to the effect of the stopped or slow moving downstream traffic subtracted from (2) a portion of an expected acceleration of the ego vehicle in the second lane due to the effect of the stopped or slow moving downstream traffic.

For example, the third term can further include a first weight. The third term can be equal to a product of the first weight multiplied by the first difference. For example, the first weight can be referred to as the "downstream effect" factor. For example, a typical value for the first weight can be about one hundred.

Additionally, for example, the equation can include the first term for a portion of the acceleration gain of the ego vehicle due to an effect of an action performed by the ego vehicle. For example, the first term can account for a "selfishness" contribution to the total acceleration gain.

For example, the first term can include a second difference. The second difference can be of: (1) a portion of the current acceleration of the ego vehicle in the first lane due to the effect of the action performed by the ego vehicle subtracted from (2) a portion of the expected acceleration of the ego vehicle in the second lane due to the effect of the action performed by the ego vehicle.

For example, the first term can further include a second weight. The first term can be equal to a product of the second weight multiplied by the second difference. For example, the second weight can be referred to as the "selfishness" factor. For example, a typical value for the second weight can be about one.

Additionally, for example, the equation can include the second term for a portion of the total acceleration gain due to an effect of one or more actions performed by the one or more vehicles in the vicinity of the ego vehicle. For example, the second term can account for a "politeness" contribution to the total acceleration gain.

For example, the second term can include a sum. The sum can be of a third difference added to a fourth difference. The third difference can be of: (1) a current acceleration of a vehicle in the second lane subtracted from (2) an expected acceleration of the vehicle in the second lane that, in response to the change by the ego vehicle from moving within the first lane to moving within the second lane, follows the ego vehicle in the second lane. The fourth difference can be of: (1) a current acceleration of a vehicle in the first lane that follows the ego vehicle in the first lane subtracted from (2) an expected acceleration of the vehicle in the first lane that, in response to the change by the ego vehicle from moving within the first lane to moving within the second lane, ceases to follow the ego vehicle.

For example, the second term can further include a third weight. The second term can be equal to a product of the third weight multiplied by the sum of the third difference added to the fourth difference. For example, the third weight can be referred to as the "politeness" factor. For example, a typical value for the third weight can be about one.

Although the description of the first configuration is from a perspective of an environment that includes a road that includes, for traffic moving in one direction, two lanes, one of skill in the art understands, in light of the description herein, that the disclosed technologies associated with the first configuration can be used in an environment that includes a road that includes, for traffic moving in one direction, more than two lanes.

In a second configuration, the stopped or slow moving downstream traffic can be one or more of downstream in the first lane or downstream on a different road within a determined path of travel for the ego vehicle. For example, the different road can be a ramp of an interchange. The information about the end of the stopped or slow moving downstream traffic can include: (1) a position of a vehicle at a front end of the stopped or slow moving downstream traffic and (2) a velocity of the vehicle at the front end.

At an operation 508, for example, the turning point module 212 can calculate, based on: (1) the position of the vehicle at the front end of the stopped or slow moving downstream traffic, (2) the velocity of the vehicle at the front end, and (3) an expected velocity of the ego vehicle in the second lane, an abreast position. The abreast position can be a position at which the ego vehicle, in the second lane, is adjacent to the vehicle at the front end.

At an operation 510, for example, the turning point module 212 can obtain, via the communications device 204 and from a navigation system, an intersection position. The intersection position can be a position of an intersection between a current road, on which the ego vehicle exists, and the different road.

At an operation 512, for example, the turning point module 212 can include instructions that function to control the processor 202 to determine a relationship between a first distance and a sum of a second distance added to a third distance. The first distance can be a distance between the intersection position and a current position of the ego vehicle. The second distance can be a distance between the abreast position and the current position of the ego vehicle. The third distance can be a safe distance for the ego vehicle to perform a lane change.

For example, in response to the relationship being that the first distance is less than the sum of the second distance added to the third distance, the information about the virtual vehicles can include a speed of a first virtual vehicle and a speed of a second virtual vehicle. The first virtual vehicle can be positioned in the second lane adjacent to a vehicle at a back end of the stopped or slow moving downstream traffic. The speed of the first virtual vehicle can be set to zero. The second virtual vehicle can be positioned in a third lane adjacent to the first virtual vehicle. The speed of the second virtual vehicle can be set to zero. For example, a portion of the total acceleration gain due to an effect of the stopped or slow moving downstream traffic can be determined from the information about the virtual vehicles.

Alternatively, for example, in response to the relationship being that the first distance is greater than or equal to the sum of the second distance added to the third distance, the information about the virtual vehicles can include a speed of a first virtual vehicle and a speed of a second virtual vehicle. The first virtual vehicle can be positioned in the second lane at a first point. The first point can be adjacent to the geographic location. The geographic location can be the intersection position. The speed of the first virtual vehicle can be set to zero. The second virtual vehicle can be positioned in a third lane at a second point. The second point can be upstream, by the third distance, from a third point. The third point can be adjacent to the first virtual vehicle. The speed of the second virtual vehicle can set to zero. For example, a portion of the total acceleration gain due to an effect of the stopped or slow moving downstream traffic can be determined from the information about the virtual vehicles.

Although the description of the second configuration is from a perspective of an environment that includes a road that includes, for traffic moving in one direction, three lanes, one of skill in the art understands, in light of the description herein, that the disclosed technologies associated with the first configuration can be used in an environment that includes a road that includes, for traffic moving in one direction, more than three lanes.

At an operation 514, for example, the communications module 210 can cause a signal, with information based on the result of the equation, to be sent to a component of the ego vehicle for an action to be performed by the component.

For example, the communications module 210 can cause, in response to a value of the result of the equation being greater than a first threshold value, the signal to be sent to the component of the ego vehicle for the action to be performed by the component. For example, the first threshold value can be a threshold acceleration gain. For example, a criterion of having the value of the result of the equation being greater than the threshold acceleration gain can be referred to as an incentive criterion.

For example, the communications module 210 can cause, in response to the value of the result of the equation being greater than the first threshold value and another criterion being greater than a second threshold value, the signal to be sent to the component of the ego vehicle for the action to be performed by the component. For example, the other criterion can be an expected acceleration of a vehicle in a second lane that, in response to a change by the ego vehicle from moving within the first lane to moving within the second lane, follows the ego vehicle in the second lane. For example, the second threshold value can be a difference of a safe deceleration limit subtracted from zero. For example, a criterion of having the expected acceleration of the vehicle in the second lane that, in response to the change by the ego vehicle from moving within the first lane to moving within the second lane, follows the ego vehicle in the second lane being greater than the difference of the safe deceleration limit subtracted from zero can be referred to as a safety criterion.

In a third configuration, the ego vehicle can be an automated vehicle. The communications module 210 can cause the signal, with the information based on the result of the equation being based on the result being that a total acceleration gain associated with the lane change decision is greater than a threshold acceleration gain, to be sent to one or more vehicle systems of the ego vehicle to cause the one or more vehicle systems to cause the ego vehicle to change from moving within the first lane to moving within a second lane.

In a fourth configuration, the communications module 210 can cause the signal, with the information based on the result of the equation, to be sent to an output system of the ego vehicle to cause the information based on the result of the equation to be presented to an operator of the ego vehicle. For example, the output system can be one or more of a display, a speaker, a haptic device, or the like. For example, the display can be one or more of a console display, a head up display, or the like.

Figure 6:
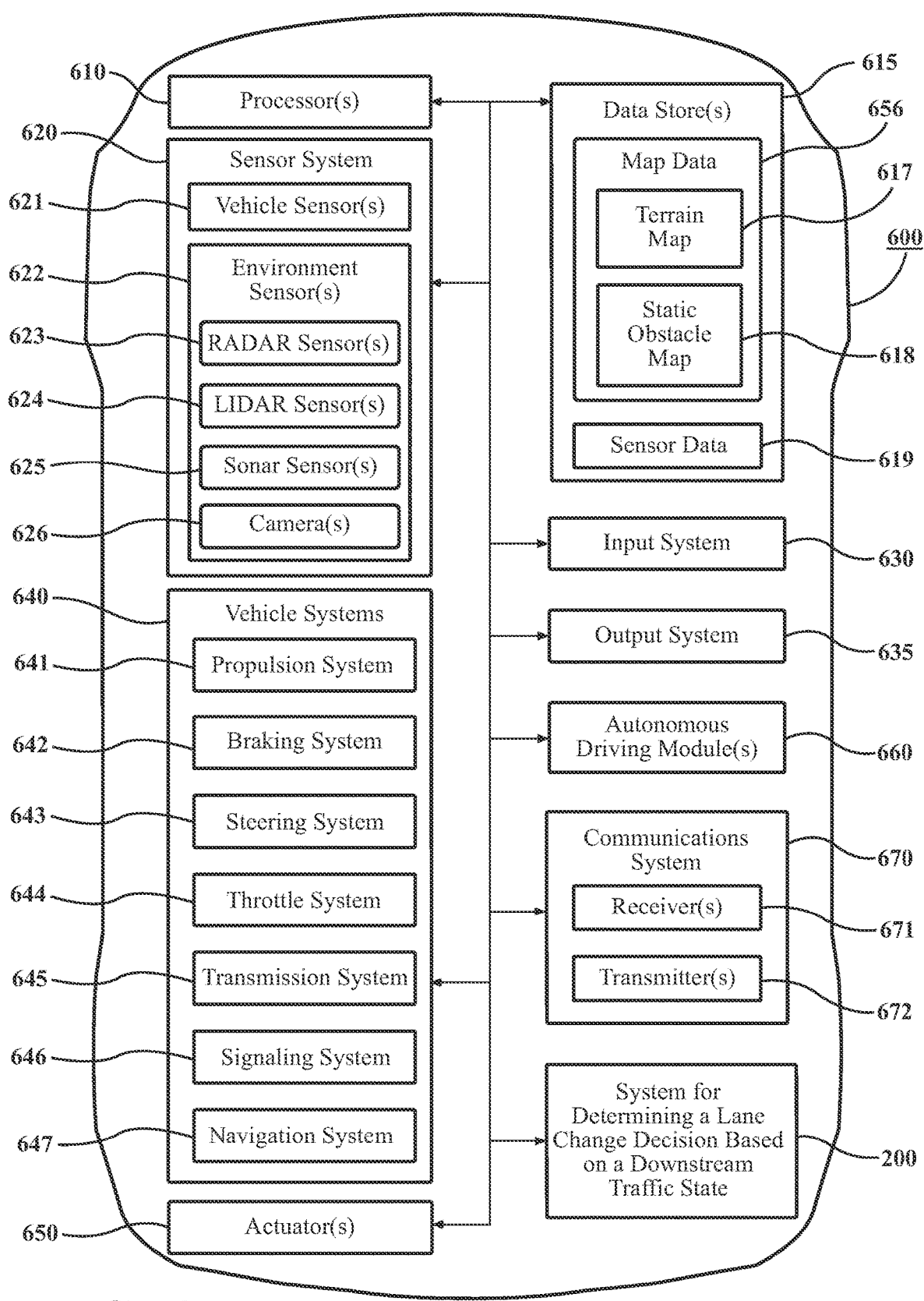
FIG. 6 includes a block diagram that illustrates an example of elements disposed on a vehicle, according to the disclosed technologies.

FIG. 6 includes a block diagram that illustrates an example of elements disposed on a vehicle 600, according to the disclosed technologies. As used herein, a "vehicle" can be any form of powered transport. In one or more implementations, the vehicle 600 can be an automobile. While arrangements described herein are with respect to automobiles, one of skill in the art understands, in light of the description herein, that embodiments are not limited to automobiles.

In some embodiments, the vehicle 600 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 600 is performed according to inputs received from a user (e.g., human driver). In one or more arrangements, the vehicle 600 can be a conventional vehicle that is configured to operate in only a manual mode.

In one or more embodiments, the vehicle 600 can be an automated vehicle. As used herein, "automated vehicle" can refer to a vehicle that operates in an automated mode. As used herein, "automated mode" can refer to navigating and/or maneuvering the vehicle 600 along a travel route using one or more computing systems to control the vehicle 600 with minimal or no input from a human driver. In one or more embodiments, the vehicle 600 can be highly automated or completely automated. In one embodiment, the vehicle 600 can be configured with one or more semi-automated operational modes in which one or more computing systems perform a portion of the navigation and/or maneuvering of the vehicle along a travel route, and a vehicle operator (i.e., driver) provides inputs to the vehicle 600 to perform a portion of the navigation and/or maneuvering of the vehicle 600 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 600 can include various elements. The vehicle 600 can have any combination of the various elements illustrated in FIG. 6. In various embodiments, it may not be necessary for the vehicle 600 to include all of the elements illustrated in FIG. 6. Furthermore, the vehicle 600 can have elements in addition to those illustrated in FIG. 6. While the various elements are illustrated in FIG. 6 as being located within the vehicle 600, one or more of these elements can be located external to the vehicle 600. Furthermore, the elements illustrated may be physically separated by large distances. For example, as described, one or more components of the disclosed system can be implemented within the vehicle 600 while other components of the system can be implemented within a cloud-computing environment, as described below. For example, the elements can include one or more processors 610, one or more data stores 615, a sensor system 620, an input system 630, an output system 635, vehicle systems 640, one or more actuators 650, one or more automated driving modules 660, a communications system 670, and the system 200 for determining a lane change decision based on a downstream traffic state.

In one or more arrangements, the one or more processors 610 can be a main processor of the vehicle 500. For example, the one or more processors 610 can be an electronic control unit (ECU). For example, functions and/or operations of the processor 202 (illustrated in FIG. 2) can be realized by the one or more processors 610.

The one or more data stores 615 can store, for example, one or more types of data. For example, functions and/or operations of the memory 206 (illustrated in FIG. 2) can be realized by the one or more data stores 615. The one or more data stores 615 can include volatile memory and/or non-volatile memory. Examples of suitable memory for the one or more data stores 615 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 615 can be a component of the one or more processors 610. Additionally or alternatively, the one or more data stores 615 can be operatively connected to the one or more processors 610 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 615 can store map data 616. The map data 616 can include maps of one or more geographic areas. In some instances, the map data 616 can include information or data on roads, traffic control devices, road markings, structures, features, and/or landmarks in the one or more geographic areas. The map data 616 can be in any suitable form. In some instances, the map data 616 can include aerial views of an area. In some instances, the map data 616 can include ground views of an area, including 360-degree ground views. The map data 616 can include measurements, dimensions, distances, and/or information for one or more items included in the map data 616 and/or relative to other items included in the map data 616. The map data 616 can include a digital map with information about road geometry. The map data 616 can be high quality and/or highly detailed.

In one or more arrangements, the map data 616 can include one or more terrain maps 617. The one or more terrain maps 617 can include information about the ground, terrain, roads, surfaces, and/or other features of one or more geographic areas. The one or more terrain maps 617 can include elevation data of the one or more geographic areas. The map data 616 can be high quality and/or highly detailed. The one or more terrain maps 617 can define one or more ground surfaces, which can include paved roads, unpaved roads, land, and other things that define a ground surface.

In one or more arrangements, the map data 616 can include one or more static obstacle maps 618. The one or more static obstacle maps 618 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 618 can have location data, size data, dimension data, material data, and/or other data associated with them. The one or more static obstacle maps 618 can include measurements, dimensions, distances, and/or information for one or more static obstacles. The one or more static obstacle maps 618 can be high quality and/or highly detailed. The one or more static obstacle maps 618 can be updated to reflect changes within a mapped area.

In one or more arrangements, the one or more data stores 615 can store sensor data 619. As used herein, "sensor data" can refer to any information about the sensors with which the vehicle 600 can be equipped including the capabilities of and other information about such sensors. The sensor data 619 can relate to one or more sensors of the sensor system 620. For example, in one or more arrangements, the sensor data 619 can include information about one or more lidar sensors 624 of the sensor system 620.

In some arrangements, at least a portion of the map data 616 and/or the sensor data 619 can be located in one or more data stores 615 that are located onboard the vehicle 600. Alternatively or additionally, at least a portion of the map data 616 and/or the sensor data 619 can be located in one or more data stores 615 that are located remotely from the vehicle 600.

The sensor system 620 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 620 includes a plurality of sensors, the sensors can work independently from each other. Alternatively, two or more of the sensors can work in combination with each other. In such a case, the two or more sensors can form a sensor network. The sensor system 620 and/or the one or more sensors can be operatively connected to the one or more processors 610, the one or more data stores 615, and/or another element of the vehicle 600 (including any of the elements illustrated in FIG. 6). The sensor system 620 can acquire data of at least a portion of the external environment of the vehicle 600 (e.g., nearby vehicles). The sensor system 620 can include any suitable type of sensor. Various examples of different types of sensors are described herein. However, one of skill in the art understands that the embodiments are not limited to the particular sensors described herein.

The sensor system 620 can include one or more vehicle sensors 621. The one or more vehicle sensors 621 can detect, determine, and/or sense information about the vehicle 600 itself. In one or more arrangements, the one or more vehicle sensors 621 can be configured to detect and/or sense position and orientation changes of the vehicle 600 such as, for example, based on inertial acceleration. In one or more arrangements, the one or more vehicle sensors 621 can include one or more accelerometers, one or more gyroscopes, an inertial measurement unit (IMU), a dead-reckoning system, a global navigation satellite system (GNSS), a global positioning system (GPS), a navigation system 647, and/or other suitable sensors. The one or more vehicle sensors 621 can be configured to detect and/or sense one or more characteristics of the vehicle 600. In one or more arrangements, the one or more vehicle sensors 621 can include a speedometer to determine a current speed of the vehicle 600.

Alternatively or additionally, the sensor system 620 can include one or more environment sensors 622 configured to acquire and/or sense driving environment data. As used herein, "driving environment data" can include data or information about the external environment in which a vehicle is located or one or more portions thereof. For example, the one or more environment sensors 622 can be configured to detect, quantify, and/or sense obstacles in at least a portion of the external environment of the vehicle 600 and/or information/data about such obstacles. Such obstacles may be stationary objects and/or dynamic objects. The one or more environment sensors 622 can be configured to detect, measure, quantify, and/or sense other things in the external environment of the vehicle 600 such as, for example, lane markers, signs, traffic lights, traffic signs, lane lines, crosswalks, curbs proximate the vehicle 600, off-road objects, etc.

Various examples of sensors of the sensor system 620 are described herein. The example sensors may be part of the one or more vehicle sensors 621 and/or the one or more environment sensors 622. However, one of skill in the art understands that the embodiments are not limited to the particular sensors described.

In one or more arrangements, the one or more environment sensors 622 can include one or more radar sensors 623, one or more lidar sensors 624, one or more sonar sensors 625, and/or one more cameras 626. In one or more arrangements, the one or more cameras 626 can be one or more high dynamic range (HDR) cameras or one or more infrared (IR) cameras. For example, the one or more cameras 626 can be used to record a reality of a state of an item of information that can appear in the digital map.

The input system 630 can include any device, component, system, element, arrangement, or groups thereof that enable information/data to be entered into a machine. The input system 630 can receive an input from a vehicle passenger (e.g., a driver or a passenger). The output system 635 can include any device, component, system, element, arrangement, or groups thereof that enable information/data to be presented to a vehicle passenger (e.g., a driver or a passenger).

Various examples of the one or more vehicle systems 640 are illustrated in FIG. 6. However, one of skill in the art understands that the vehicle 600 can include more, fewer, or different vehicle systems. Although particular vehicle systems can be separately defined, each or any of the systems or portions thereof may be otherwise combined or segregated via hardware and/or software within the vehicle 600. For example, the one or more vehicle systems 640 can include a propulsion system 641, a braking system 642, a steering system 643, a throttle system 644, a transmission system 645, a signaling system 646, and/or the navigation system 647. Each of these systems can include one or more devices, components, and/or a combination thereof, now known or later developed.

The navigation system 647 can include one or more devices, applications, and/or combinations thereof, now known or later developed, configured to determine the geographic location of the vehicle 600 and/or to determine a travel route for the vehicle 600. The navigation system 647 can include one or more mapping applications to determine a travel route for the vehicle 600. The navigation system 647 can include a global positioning system, a local positioning system, a geolocation system, and/or a combination thereof.

The one or more actuators 650 can be any element or combination of elements operable to modify, adjust, and/or alter one or more of the vehicle systems 640 or components thereof responsive to receiving signals or other inputs from the one or more processors 610 and/or the one or more automated driving modules 660. Any suitable actuator can be used. For example, the one or more actuators 650 can include motors, pneumatic actuators, hydraulic pistons, relays, solenoids, and/or piezoelectric actuators.

The one or more processors 610 and/or the one or more automated driving modules 660 can be operatively connected to communicate with the various vehicle systems 640 and/or individual components thereof. For example, the one or more processors 610 and/or the one or more automated driving modules 660 can be in communication to send and/or receive information from the various vehicle systems 640 to control the movement, speed, maneuvering, heading, direction, etc. of the vehicle 600. The one or more processors 610 and/or the one or more automated driving modules 660 may control some or all of these vehicle systems 640 and, thus, may be partially or fully automated.

The one or more processors 610 and/or the one or more automated driving modules 660 may be operable to control the navigation and/or maneuvering of the vehicle 600 by controlling one or more of the vehicle systems 640 and/or components thereof. For example, when operating in an automated mode, the one or more processors 610 and/or the one or more automated driving modules 660 can control the direction and/or speed of the vehicle 600. The one or more processors 610 and/or the one or more automated driving modules 660 can cause the vehicle 600 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 670 can include one or more receivers 671 and/or one or more transmitters 672. The communications system 670 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 670 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the communications device 204 (illustrated in FIG. 2) can be realized by the communications system 670.

Moreover, the one or more processors 610, the one or more data stores 615, and the communications system 670 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected cars.

The vehicle 600 can include one or more modules, at least some of which are described herein. The modules can be implemented as computer-readable program code that, when executed by the one or more processors 610, implement one or more of the various processes described herein. One or more of the modules can be a component of the one or more processors 610. Alternatively or additionally, one or more of the modules can be executed on and/or distributed among other processing systems to which the one or more processors 610 can be operatively connected. The modules can include instructions (e.g., program logic) executable by the one or more processors 610. Alternatively or additionally, the one or more data store 615 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 600 can include one or more automated driving modules 660. The one or more automated driving modules 660 can be configured to receive data from the sensor system 620 and/or any other type of system capable of capturing information relating to the vehicle 600 and/or the external environment of the vehicle 600. In one or more arrangements, the one or more automated driving modules 660 can use such data to generate one or more driving scene models. The one or more automated driving modules 660 can determine position and velocity of the vehicle 600. The one or more automated driving modules 660 can determine the location of obstacles, obstacles, or other environmental features including traffic signs, trees, shrubs, neighboring vehicles, pedestrians, etc.

The one or more automated driving modules 660 can be configured to receive and/or determine location information for obstacles within the external environment of the vehicle 600 for use by the one or more processors 610 and/or one or more of the modules described herein to estimate position and orientation of the vehicle 600, vehicle position in global coordinates based on signals from a plurality of satellites, or any other data and/or signals that could be used to determine the current state of the vehicle 600 or determine the position of the vehicle 600 with respect to its environment for use in either creating a map or determining the position of the vehicle 600 in respect to map data.

The one or more automated driving modules 660 can be configured to determine one or more travel paths, current automated driving maneuvers for the vehicle 600, future automated driving maneuvers and/or modifications to current automated driving maneuvers based on data acquired by the sensor system 620, driving scene models, and/or data from any other suitable source such as determinations from the sensor data 619. As used herein, "driving maneuver" can refer to one or more actions that affect the movement of a vehicle. Examples of driving maneuvers include: accelerating, decelerating, braking, turning, moving in a lateral direction of the vehicle 600, changing travel lanes, merging into a travel lane, and/or reversing, just to name a few possibilities. The one or more automated driving modules 660 can be configured to implement determined driving maneuvers. The one or more automated driving modules 660 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 660 can be configured to execute various vehicle functions and/or to transmit data to, receive data from, interact with, and/or control the vehicle 600 or one or more systems thereof (e.g., one or more of vehicle systems 640). For example, functions and/or operations of an automotive navigation system can be realized by the one or more automated driving modules 660.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-6, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor disposed on an ego vehicle;
a communications device; and
a memory storing:
an acceleration gain module including instructions that when executed by the processor cause the processor to:
obtain, via a communications device and from a monitoring system, information about an end of stopped or slow moving downstream traffic in a first lane; and
calculate a result of an equation for a lane change decision, the equation including information about virtual vehicles positioned near the end or at a geographical location, the equation including a first term and a second term, the first term being for a portion of an acceleration gain of the ego vehicle due to an effect of the stopped or slow moving downstream traffic, the second term being for a different portion of a total acceleration gain; and
a communications module including instructions that when executed by the processor cause the processor to cause a signal, with information based on the result, to be sent to at least one vehicle system of the ego vehicle to cause the ego vehicle to change from moving within the first lane to moving within a second lane.

2. The system of claim 1, wherein the equation is for a measure of the total acceleration gain, for at least one of the ego vehicle or at least one vehicle in a vicinity of the ego vehicle, associated with the lane change decision.

3. The system of claim 2, wherein:
the information about the end of the stopped or slow moving downstream traffic is information about a back end of the stopped or slow moving downstream traffic,
the information about the virtual vehicles includes:
a speed of a first virtual vehicle, the first virtual vehicle being positioned in the first lane behind the back end, the speed of the first virtual vehicle representing an average speed of traffic in the first lane in a vicinity of the first virtual vehicle, and
a speed of a second virtual vehicle, the second virtual vehicle being positioned in the second lane adjacent to the first virtual vehicle, the speed of the second virtual vehicle representing an average speed of traffic in the second lane in a vicinity of the second virtual vehicle, and
the portion of the acceleration gain of the ego vehicle due to the effect of the stopped or slow moving downstream traffic is determined from the information about the virtual vehicles.

4. The system of claim 3, wherein the information about the back end includes a position of a vehicle at the back end and a velocity of the vehicle at the back end.

5. The system of claim 4, wherein the acceleration gain module further includes instructions that when executed by the processor cause the processor to obtain, via the communications device and from the monitoring system, other information about the stopped or slow moving downstream traffic, the other information including at least one of a position of a vehicle at a front end of the stopped or slow moving downstream traffic, a velocity of the vehicle at the front end, or an average velocity of the stopped or slow moving downstream traffic.

6. The system of claim 3, wherein the first term comprises a first difference of:
a portion of a current acceleration of the ego vehicle in the first lane due to the effect of the stopped or slow moving downstream traffic
subtracted from
a portion of an expected acceleration of the ego vehicle in the second lane due to the effect of the stopped or slow moving downstream traffic.

7. The system of claim 6, wherein the first term further comprises a first weight, the first term being equal to a product of the first weight multiplied by the first difference.

8. The system of claim 3, wherein the second term is for a portion of the acceleration gain of the ego vehicle due to an effect of an action performed by the ego vehicle.

9. The system of claim 8, wherein the second term comprises a second difference of:
a portion of a current acceleration of the ego vehicle in the first lane due to the effect of the action performed by the ego vehicle
subtracted from
a portion of an expected acceleration of the ego vehicle in the second lane due to the effect of the action performed by the ego vehicle.

10. The system of claim 9, wherein the second term further comprises a second weight, the second term being equal to a product of the second weight multiplied by the second difference.

11. The system of claim 3, wherein the second term is for a portion of the total acceleration gain due to an effect of at least one action performed by the at least one vehicle in the vicinity of the ego vehicle.

12. The system of claim 11, wherein:
the second term comprises a sum of a second difference added to a third difference, the second difference being of:
a current acceleration of a vehicle in the second lane
subtracted from
an expected acceleration of the vehicle in the second lane that, in response to the change by the ego vehicle from moving within the first lane to moving within the second lane, follows the ego vehicle in the second lane, and
the third difference being of:
a current acceleration of a vehicle in the first lane that follows the ego vehicle in the first lane
subtracted from
an expected acceleration of the vehicle in the first lane that, in response to the change by the ego vehicle from moving within the first lane to moving within the second lane, ceases to follow the ego vehicle.

13. The system of claim 12, wherein the second term further comprises a second weight, the second term being equal to a product of the second weight multiplied by the sum.

14. The system of claim 2, wherein:
the stopped or slow moving downstream traffic is at least one of downstream in the first lane or downstream on a different road within a determined path of travel for the ego vehicle,
the information about the end of the stopped or slow moving downstream traffic comprises:
a position of a vehicle at a front end of the stopped or slow moving downstream traffic, and
a velocity of the vehicle at the front end, and
the memory further stores a turning point module including instructions that when executed by the processor cause the processor to:
calculate, based on:
the position of the vehicle at the front end,
the velocity of the vehicle at the front end, and
an expected velocity of the ego vehicle in the second lane,
an abreast position, the abreast position being a position at which the ego vehicle, in the second lane, is adjacent to the vehicle at the front end;
obtain, via the communications device and from a navigation system, an intersection position, the intersection position being a position of an intersection between a current road, on which the ego vehicle exists, and the different road; and
determine a relationship between a first distance and a sum of a second distance added to a third distance, the first distance being a distance between the intersection position and a current position of the ego vehicle, the second distance being a distance between the abreast position and the current position, the third distance being a safe distance for the ego vehicle to perform a lane change.

15. The system of claim 14, wherein:
in response to the relationship being that the first distance is less than the sum of the second distance added to the third distance, the information about the virtual vehicles includes:
a speed of a first virtual vehicle, the first virtual vehicle being positioned in the second lane adjacent to a vehicle at a back end of the stopped or slow moving downstream traffic, the speed of the first virtual vehicle being set to zero, and
a speed of a second virtual vehicle, the second virtual vehicle being positioned in a third lane adjacent to the first virtual vehicle, the speed of the second virtual vehicle being set to zero, and
a portion of the total acceleration gain due to an effect of the stopped or slow moving downstream traffic is determined from the information about the virtual vehicles.

16. The system of claim 14, wherein:
in response to the relationship being that the first distance is greater than or equal to the sum of the second distance added to the third distance, the information about the virtual vehicles includes:
a speed of a first virtual vehicle, the first virtual vehicle being positioned in the second lane at a first point, the first point being adjacent to the geographic location, the geographic location being the intersection position, the speed of the first virtual vehicle being set to zero, and
a speed of a second virtual vehicle, the second virtual vehicle being positioned in a third lane at a second point, the second point being upstream, by the third distance, from a third point, the third point being adjacent to the first virtual vehicle, the speed of the second virtual vehicle being set to zero, and
a portion of the total acceleration gain due to an effect of the stopped or slow moving traffic is determined from the information about the virtual vehicles.

17. A method, comprising:
obtaining, by a processor of an ego vehicle, via a communications device, and from a monitoring system, information about an end of stopped or slow moving downstream traffic in a first lane;
calculating, by the processor, a result of an equation for a lane change decision, the equation including information about virtual vehicles positioned near the end or at a geographical location, the equation including a first term and a second term, the first term being for a portion of an acceleration gain of the ego vehicle due to an effect of the stopped or slow moving downstream traffic, the second term being for a different portion of a total acceleration gain; and
causing, by the processor, a signal, with information based on the result, to be sent to a at least one vehicle system of the ego to cause the ego vehicle to change from moving within the first lane to moving within a second lane.

18. The method of claim 17, wherein the causing the signal to be sent to the at least one vehicle system of the ego vehicle to cause the ego vehicle to change from moving within the first lane to moving within a second lane comprises causing, in response to a value of the result being greater than a first threshold value, the signal to be sent to the at least one vehicle system of the ego vehicle to cause the ego vehicle to change from moving within the first lane to moving within a second lane.

19. The method of claim 18, wherein:
the causing, in response to the value of the result being greater than the first threshold value, the signal to be sent to the at least one vehicle system of the ego vehicle to cause the ego vehicle to change from moving within the first lane to moving within a second lane comprises causing, in response to the value of the result being greater than the first threshold value and another criterion being greater than a second threshold value, the signal to be sent to the at least one vehicle system of the ego vehicle to cause the ego vehicle to change from moving within the first lane to moving within a second lane, the other criterion is an expected acceleration of a vehicle in a second lane that, in response to a change by the ego vehicle from moving within the first lane to moving within the second lane, follows the ego vehicle in the second lane, and the second threshold value is a difference of a safe deceleration limit subtracted from zero.

20. A non-transitory computer-readable medium for determining a lane change decision based on a downstream traffic state, the non-transitory computer-readable medium including instructions that when executed by one or more processors cause the one or more processors to:

obtain, via a communications device and from a monitoring system, information about an end of stopped or slow moving downstream traffic in a lane;

calculate a result of an equation for a lane change decision, the equation including information about virtual vehicles positioned near the end or at a geographical location, the equation including a first term and a second term, the first term being for a portion of an acceleration gain of the ego vehicle due to an effect of the stopped or slow moving downstream traffic, the second term being for a different portion of a total acceleration gain; and cause a signal, with information based on the result, to be sent to at least one vehicle system of an ego vehicle to cause the ego vehicle to change from moving within the first lane to moving within a second lane.

* * * * *

UNITED STATES PATENT AND TRADEMARK OFFICE
CERTIFICATE OF CORRECTION

| | | |
|---|---|---|
| PATENT NO. | : 12,179,763 B2 | Page 1 of 1 |
| APPLICATION NO. | : 17/474613 | |
| DATED | : December 31, 2024 | |
| INVENTOR(S) | : Yashar Zeiynali Farid, Kentaro Oguchi and Abdul Rahman Kreidieh | |

It is certified that error appears in the above-identified patent and that said Letters Patent is hereby corrected as shown below:

In the Claims

Claim 17, Line 55: delete "sent to a at least one" and insert --sent to at least one--.

Signed and Sealed this
Fourth Day of February, 2025

Coke Morgan Stewart
*Acting Director of the United States Patent and Trademark Office*